(12) United States Patent
Takagi

(10) Patent No.: US 11,139,616 B2
(45) Date of Patent: Oct. 5, 2021

(54) CHARGING CONNECTOR

(71) Applicant: JAPAN AVIATION ELECTRONICS INDUSTRY, LIMITED, Tokyo (JP)

(72) Inventor: Youhei Takagi, Irvine, CA (US)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 16/921,048

(22) Filed: Jul. 6, 2020

(65) Prior Publication Data

US 2021/0257781 A1 Aug. 19, 2021

Related U.S. Application Data

(60) Provisional application No. 62/977,442, filed on Feb. 17, 2020.

(51) Int. Cl.

| | |
|---|---|
| *H01R 13/625* | (2006.01) |
| *H01R 13/639* | (2006.01) |
| *H01R 13/627* | (2006.01) |
| *H01R 13/508* | (2006.01) |
| *B60L 53/16* | (2019.01) |
| *H01R 13/641* | (2006.01) |

(52) U.S. Cl.
CPC ............ *H01R 13/639* (2013.01); *B60L 53/16* (2019.02); *H01R 13/508* (2013.01); *H01R 13/6275* (2013.01); *H01R 13/641* (2013.01)

(58) Field of Classification Search
CPC .............. H01R 13/508; H01R 13/6275; H01R 13/639; H01R 13/641; B60L 53/16
USPC ........................................................ 439/345
See application file for complete search history.

(56) References Cited

U.S. PATENT DOCUMENTS

| 5,413,493 A | * | 5/1995 | Hoffman | ................. B60L 53/65 439/188 |
| 5,458,496 A | * | 10/1995 | Itou | ...................... H01R 13/447 439/34 |
| 5,556,284 A | * | 9/1996 | Itou | ........................ H01R 13/70 439/34 |

(Continued)

FOREIGN PATENT DOCUMENTS

| JP | 2012-156032 A | 8/2012 |
| JP | 2017-050179 A | 3/2017 |

(Continued)

*Primary Examiner* — Abdullah A Riyami
*Assistant Examiner* — Vladimir Imas
(74) *Attorney, Agent, or Firm* — Collard & Roe, P.C.

(57) ABSTRACT

A charging connector comprises a connector main, a lever and a regulating portion. The lever has a latch portion. The latch portion is provided with a locking lug. The locking lug has a locking surface. The lever comprises a main portion and a reinforcing portion. The main portion is made of resin. The reinforcing portion is made of metal plate. The reinforcing portion is held by the main portion. The reinforcing portion has a locking portion and a regulated portion. The locking portion is exposed on the locking surface. When the lever is positioned at a locked position, the regulated portion is positioned rearward beyond the regulating portion in a front-rear direction and faces the regulating portion in the front-rear direction. When the lever is positioned at the locked position, the regulating portion regulates forward movement of the regulated portion in the front-rear direction.

6 Claims, 15 Drawing Sheets

(56) References Cited

U.S. PATENT DOCUMENTS

| | | | | |
|---|---|---|---|---|
| 5,577,920 A | * | 11/1996 | Itou | B60L 53/65 |
| | | | | 439/34 |
| 5,816,643 A | * | 10/1998 | Itou | H01R 13/5213 |
| | | | | 296/97.22 |
| 8,568,155 B2 | * | 10/2013 | Sebald | H01R 24/28 |
| | | | | 439/304 |
| 8,573,994 B2 | * | 11/2013 | Kiko | B60L 53/16 |
| | | | | 439/188 |
| 9,048,567 B2 | | 6/2015 | Takagi et al. | |
| 9,318,845 B2 | * | 4/2016 | Ohmura | H01R 13/6275 |
| 9,509,095 B2 | * | 11/2016 | Ohmura | B60L 53/16 |
| 9,676,284 B2 | * | 6/2017 | Tomiyama | B60L 11/1818 |
| 9,711,904 B2 | | 7/2017 | Sasaki | |
| 9,742,140 B2 | * | 8/2017 | Crowe | H01R 43/26 |
| 9,929,509 B1 | * | 3/2018 | Penn | H01R 13/6272 |

FOREIGN PATENT DOCUMENTS

| | | |
|---|---|---|
| JP | 2017-220388 A | 12/2017 |
| JP | 2018-195413 A | 12/2018 |

* cited by examiner

CHARGING CONNECTOR

CROSS REFERENCE TO RELATED APPLICATIONS

Applicant claims priority under 35 U.S.C. § 119(e) and the benefit of U.S. Provisional Application Ser. No. 62/977,442 filed on Feb. 17, 2020, the disclosure of which is incorporated by reference.

BACKGROUND OF THE INVENTION

This invention relates to a charging connector which is mateable with an inlet.

As shown in FIG. 28, Patent Document 1 discloses a charging connector 900 which is mateable with an inlet (not shown) along an X-direction. The charging connector 900 comprises a connector main 910 and a lever 930. The lever 930 is held by the connector main 910 so as to be movable between a locked position and a released position in a seesaw manner. The lever 930 has a latch portion 940. The latch portion 940 is engaged with the inlet when the charging connector 900 is mated with the inlet. As shown in FIG. 29, the latch portion 940 is provided with a locking lug 942 and reinforcing libs 944. The locking lug 942 has a locking surface 9422. The locking surface 9422 faces in a negative X-direction when the lever 930 is positioned at the locked position. If the charging connector 900 is forcibly pulled in the negative X-direction under a state where the latch portion 940 is engaged with the inlet, a stress is applied to the locking lug 942. The stress is dispersed to a part of the lever 930 other than the latch portion 940 via the reinforcing libs 944. Accordingly, the stress is prevented from being concentrated at the latch portion 940.

[Patent Document 1] JP-A 2018-195413

If a charging connector such as that of Patent Document 1 continues to be forcibly pulled in the negative X-direction under a state where a latch portion is engaged with an inlet, the latch portion might be damaged so that the charging connector might be removed from the inlet.

SUMMARY OF THE INVENTION

It is therefore an object of the present invention to provide a charging connector comprising a lever which has a latch portion with greater strength.

One aspect of the present invention provides a charging connector mateable with an inlet along a front-rear direction. The inlet is positioned forward of the charging connector in the front-rear direction. The charging connector comprises a connector main, a lever and a regulating portion. The connector main comprises a reference surface and a mating portion. The reference surface is positioned forward beyond the regulating portion in the front-rear direction. The mating portion protrudes forward in the front-rear direction from the reference surface. The lever is held by the connector main so as to be movable between a locked position and a released position in a seesaw manner. The lever has a latch portion. The latch portion is engaged with the inlet when the charging connector is mated with the inlet. The latch portion protrudes forward beyond the reference surface when the lever is positioned at the locked position. The latch portion is provided with a locking lug. The locking lug has a locking surface. The locking surface faces rearward in the front-rear direction when the lever is positioned at the locked position. The lever comprises a main portion and a reinforcing portion. The main portion is made of resin. The reinforcing portion is made of metal plate. The reinforcing portion is held by the main portion. The reinforcing portion has a locking portion and a regulated portion. The locking portion is exposed on the locking surface. When the lever is positioned at the locked position, the regulated portion is positioned rearward beyond the regulating portion in the front-rear direction and faces the regulating portion in the front-rear direction. When the lever is positioned at the locked position, the regulating portion regulates forward movement of the regulated portion in the front-rear direction.

In the charging connector of the present invention, the lever comprises a reinforcing portion made of the metal plate. In addition, the locking portion of the reinforcing portion is exposed on the locking surface of the locking lug of the latch portion. Furthermore, when the lever is positioned at the locked position, the regulating portion of the charging connector regulates forward movement of the regulated portion of the reinforcing portion in the front-rear direction. Accordingly, the charging connector of the present invention is configured so that the latch portion is prevented from being damaged if the charging connector is intended to be forcibly pulled away from the inlet under a state where the latch portion is engaged with the inlet. In other words, the charging connector of the present invention comprises the lever which has the latch portion with greater strength.

An appreciation of the objectives of the present invention and a more complete understanding of its structure may be had by studying the following description of the preferred embodiment and by referring to the accompanying drawings.

Figure 1:
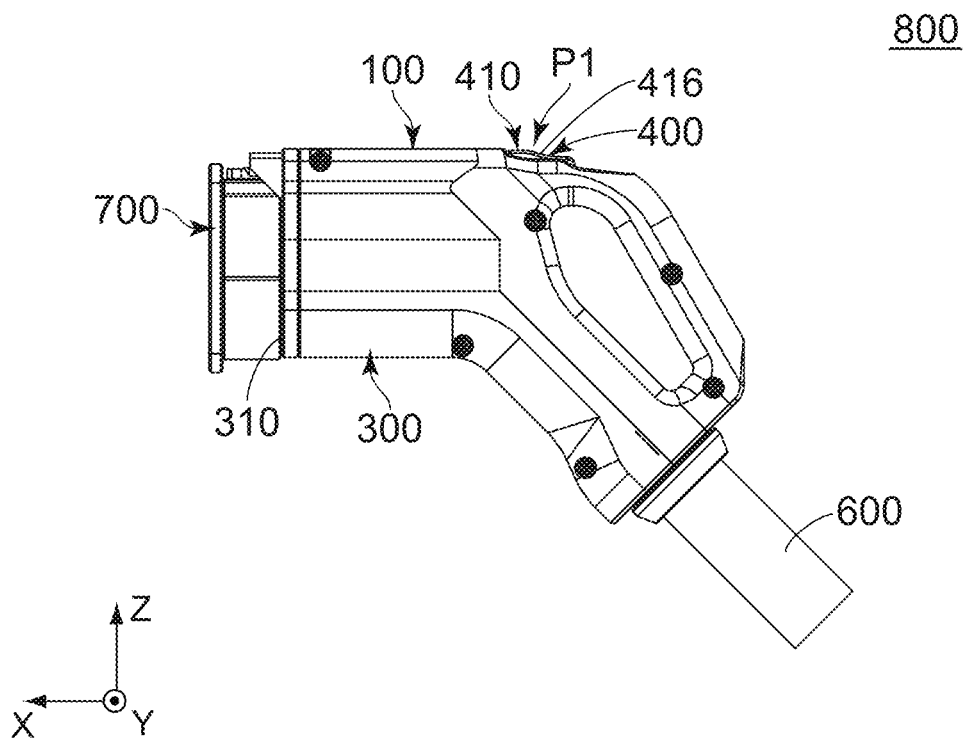
FIG. 1 is a side view showing a charging connector assembly according to an embodiment of the present invention. In the figure, a charging connector is mated with an inlet while a lever is positioned at a locked position.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
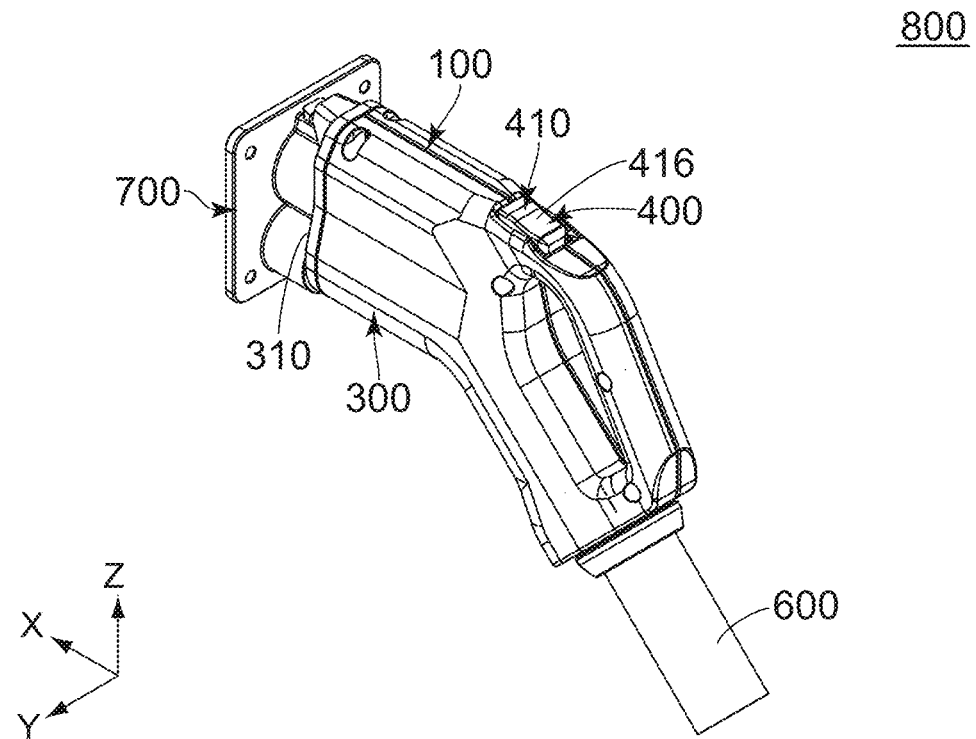
FIG. 2 is a rear, perspective view showing the charging connector assembly of FIG. 1.
Figure 3:
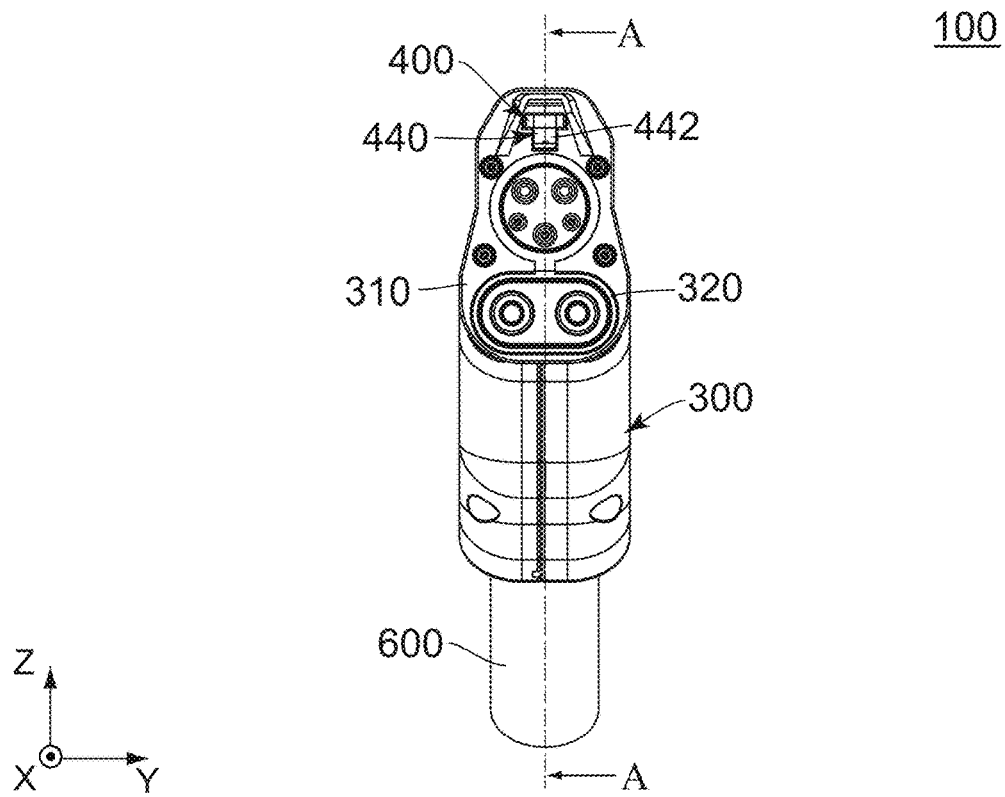
FIG. 3 is a front view showing the charging connector which is included in the charging connector assembly of FIG. 1.

As shown in FIGS. 1 and 2, a charging connector assembly 800 according to an embodiment of the present invention comprises an inlet 700 and a charging connector 100.

Figure 8:
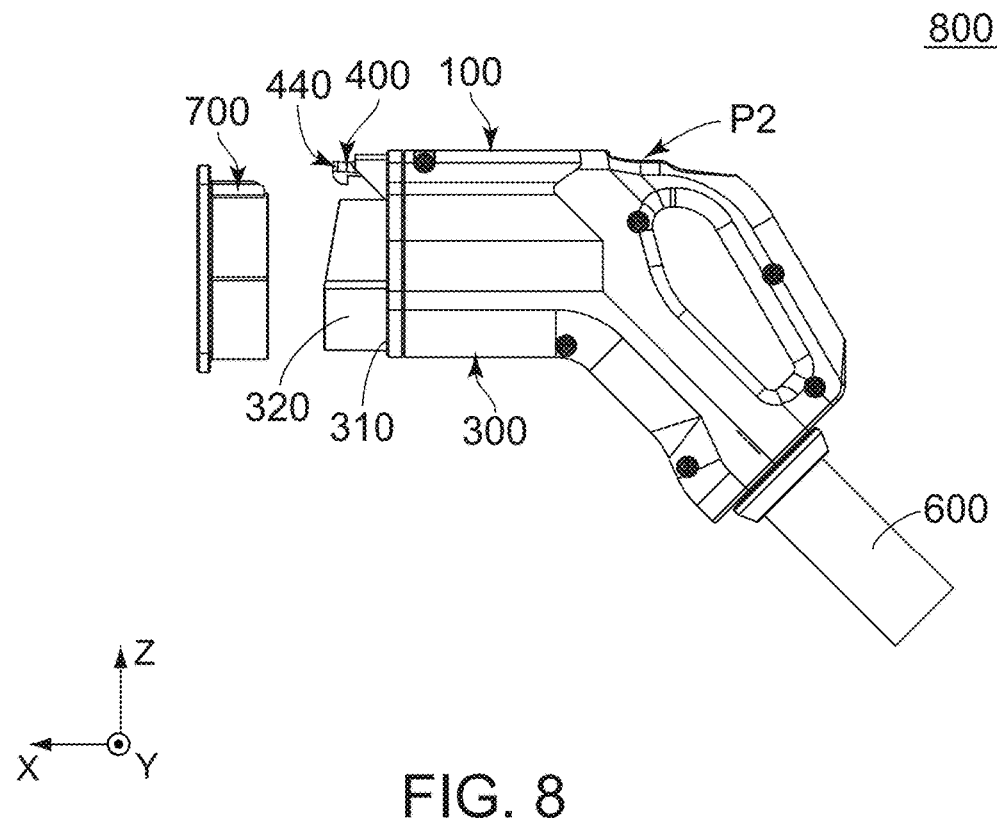
FIG. 8 is another side view showing the charging connector assembly of FIG. 1. In the figure, the charging connector is unmated from the inlet while the lever is positioned at a released position.
Figure 9:
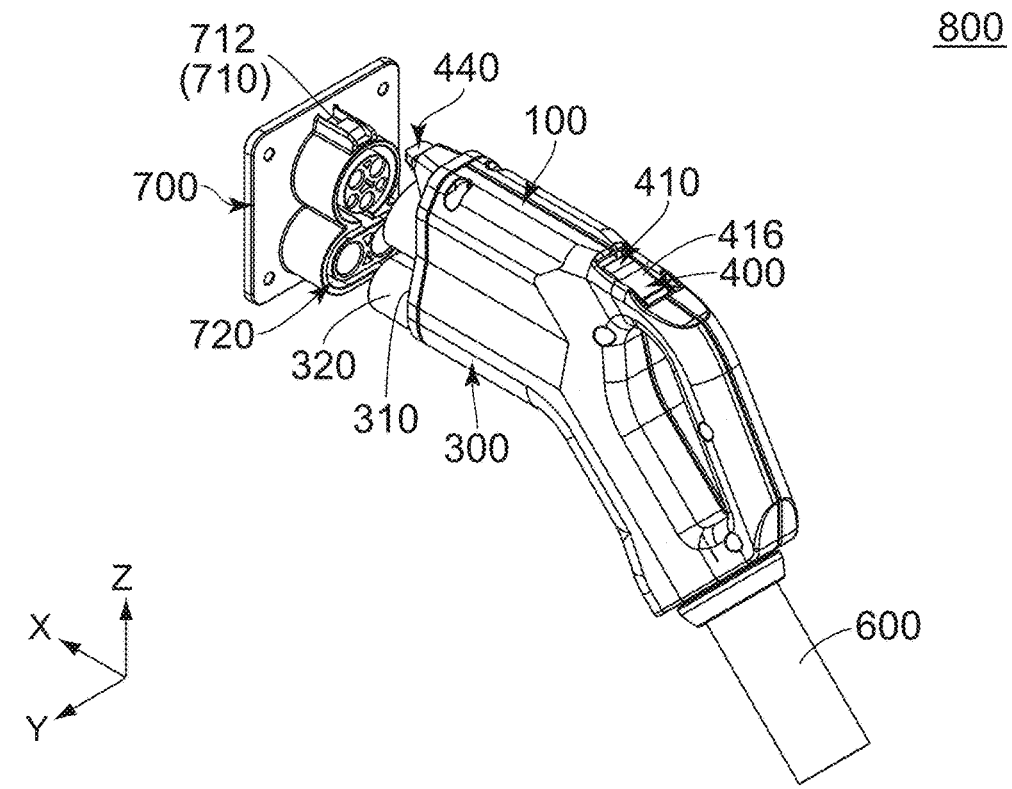
FIG. 9 is a rear, perspective view showing the charging connector assembly of FIG. 8.
Figure 10:
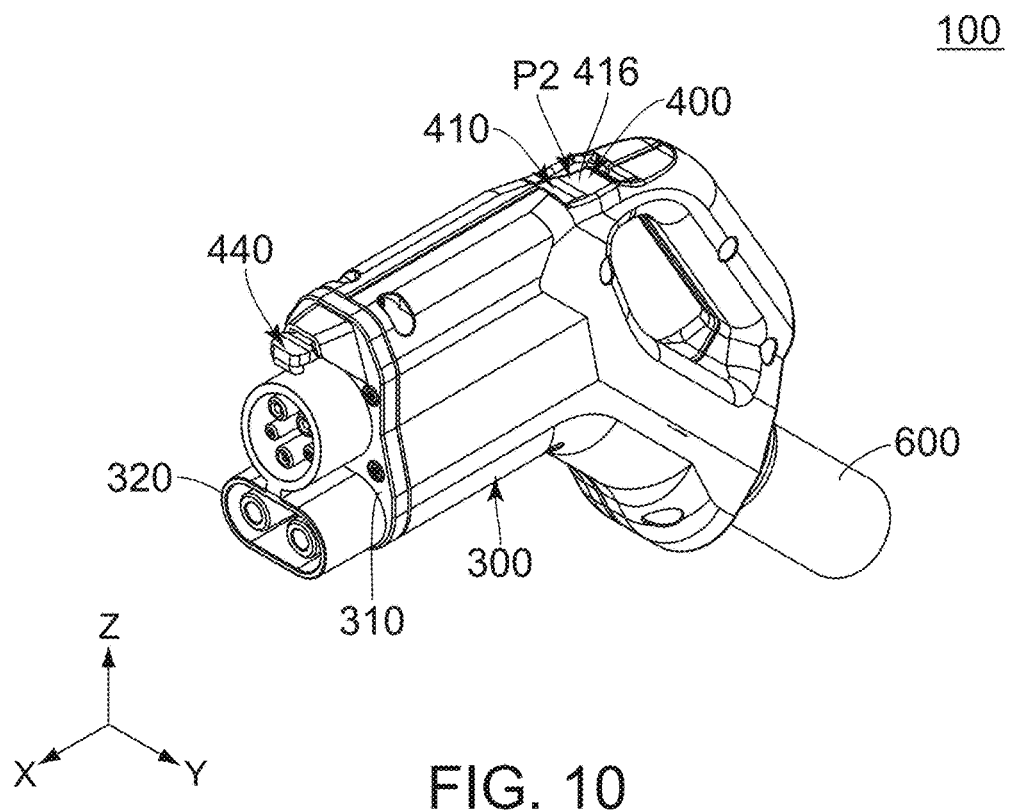
FIG. 10 is a front, perspective view showing the charging connector which is included in the charging connector assembly of FIG. 8.
Figure 11:
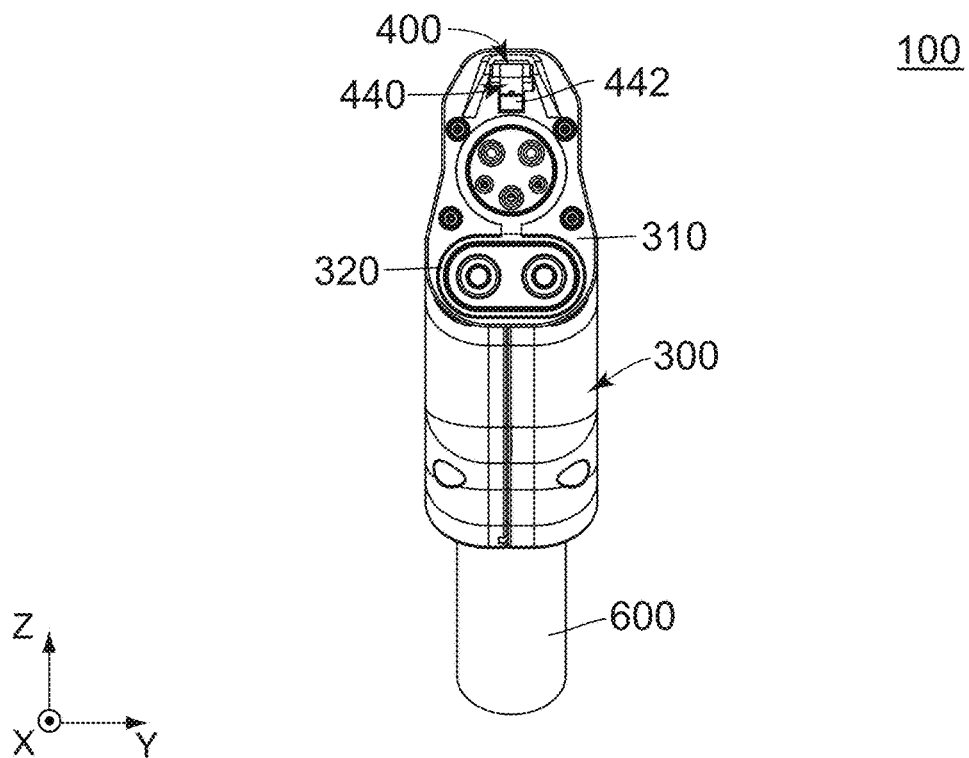
FIG. 11 is a front view showing the charging connector of FIG. 10.
Figure 12:
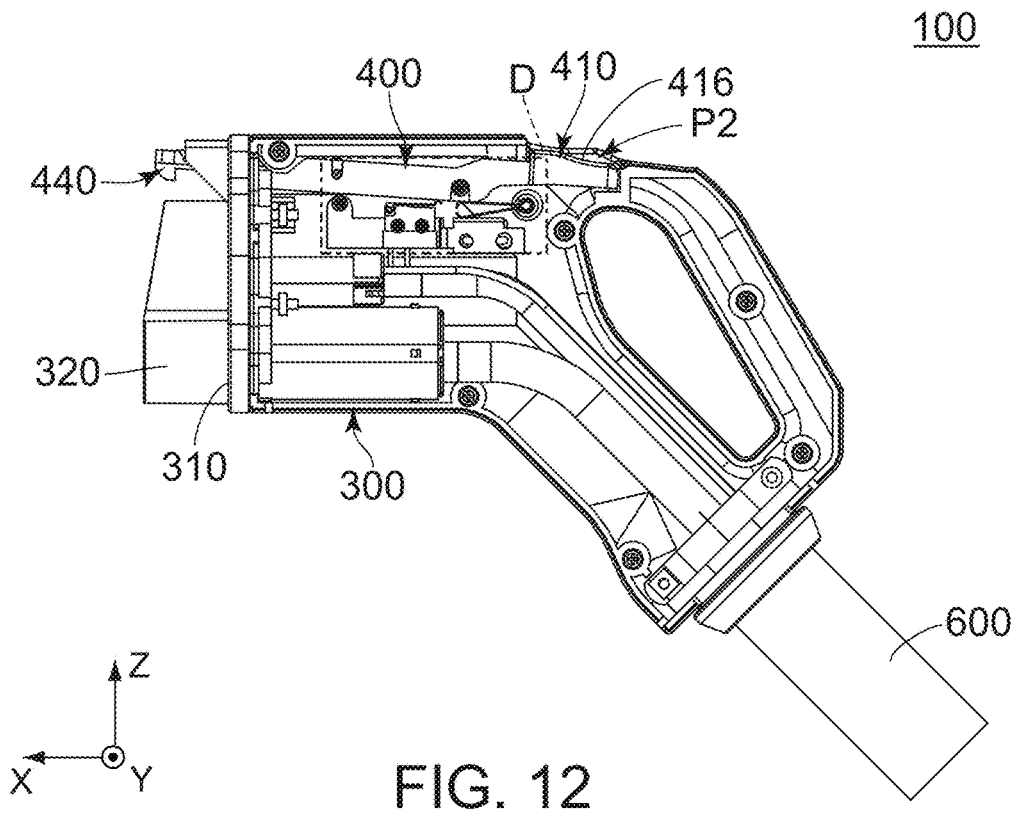
FIG. 12 is a partially cut-away, side view showing the internal structure of the charging connector of FIG. 10.
Figure 27:
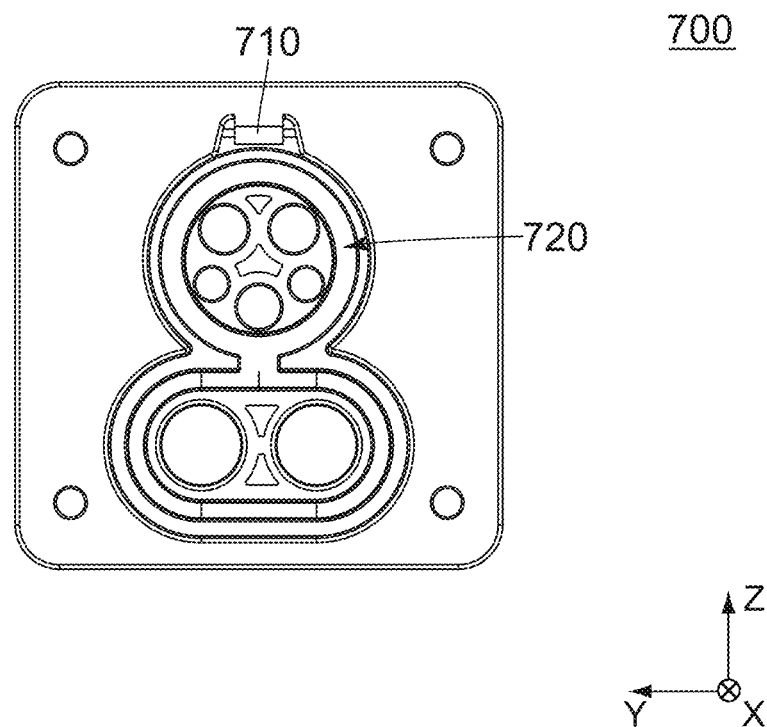
FIG. 27 is a rear view showing the inlet which is included in the charging connector assembly of FIG. 1.
Figure 28:
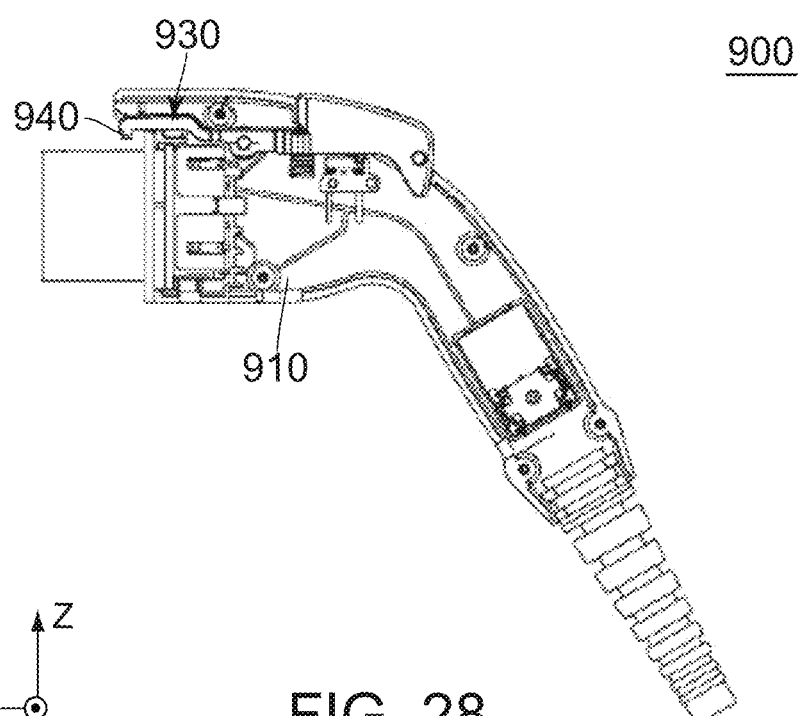
FIG. 28 is a partially cut-away, side view showing an internal structure of a charging connector of Patent Document 1.
Figure 29:
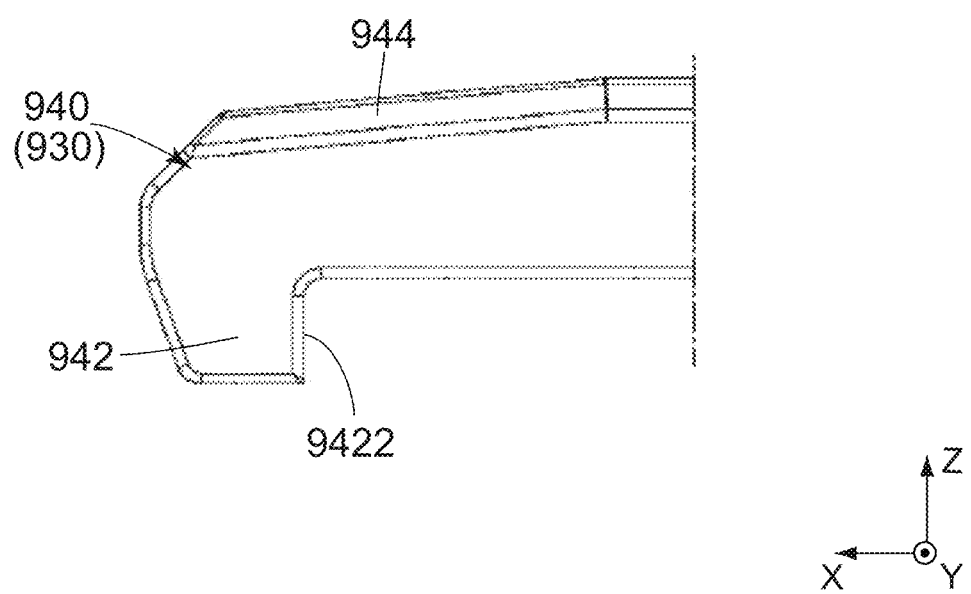
FIG. 29 is a partial, enlarged view showing the charging connector of FIG. 28.

As shown in FIGS. 1 and 8, the inlet 700 of the present embodiment is positioned forward of the charging connector 100 in a front-rear direction. In the present embodiment, the front-rear direction is an X-direction. Specifically, forward is a positive X-direction while rearward is a negative X-direction. As shown in FIGS. 9 and 27, the inlet 700 has a locked portion 710 and a mating portion receiving portion 720.

As shown in FIG. 9, the locked portion 710 of the present embodiment has a locked surface 712. The locked surface 712 faces forward in the front-rear direction.

As shown in FIG. 9, the mating portion receiving portion 720 of the present embodiment is a space which is recessed forward in the front-rear direction.

As shown in FIGS. 1 and 2, the charging connector 100 of the present embodiment is mateable with the inlet 700 along the front-rear direction.

Figure 4:
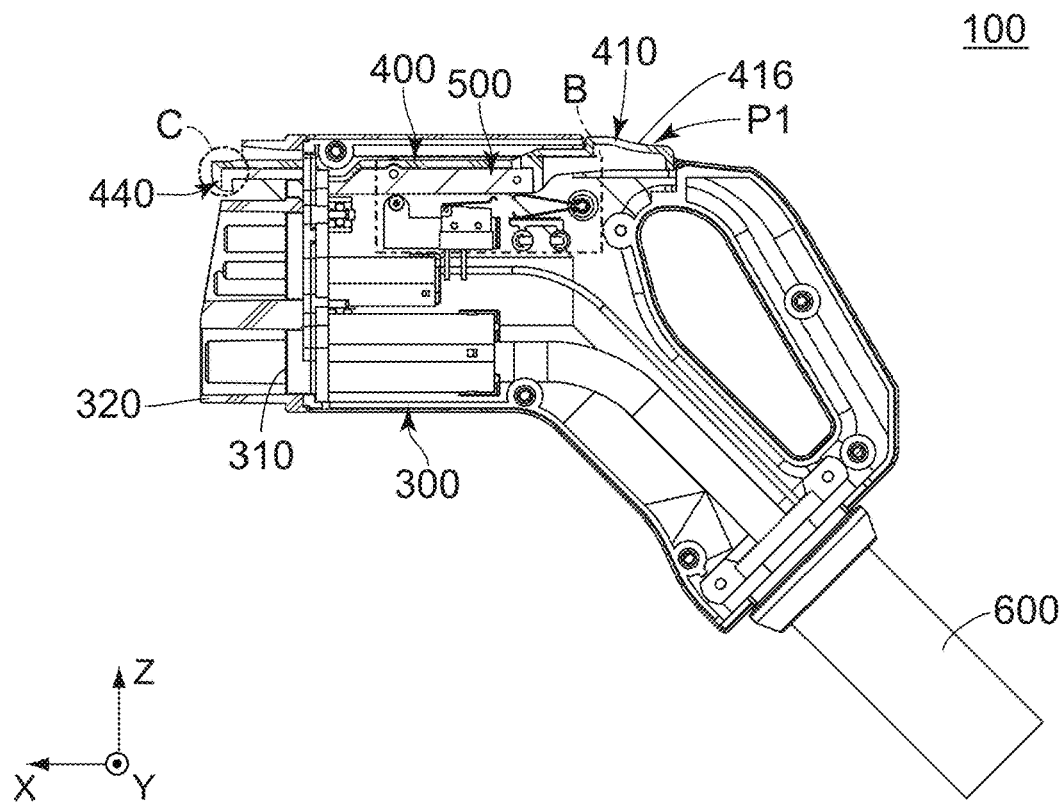
FIG. 4 is a cross-sectional view showing the charging connector of FIG. 3, taken along line A-A. In the figure, only the lever, a shaft and a screw among components included in the charging connector are seen in cross-section while the remaining components of the charging connector are seen in side view. In the figure, a cable is illustrated simplified.
Figure 5:
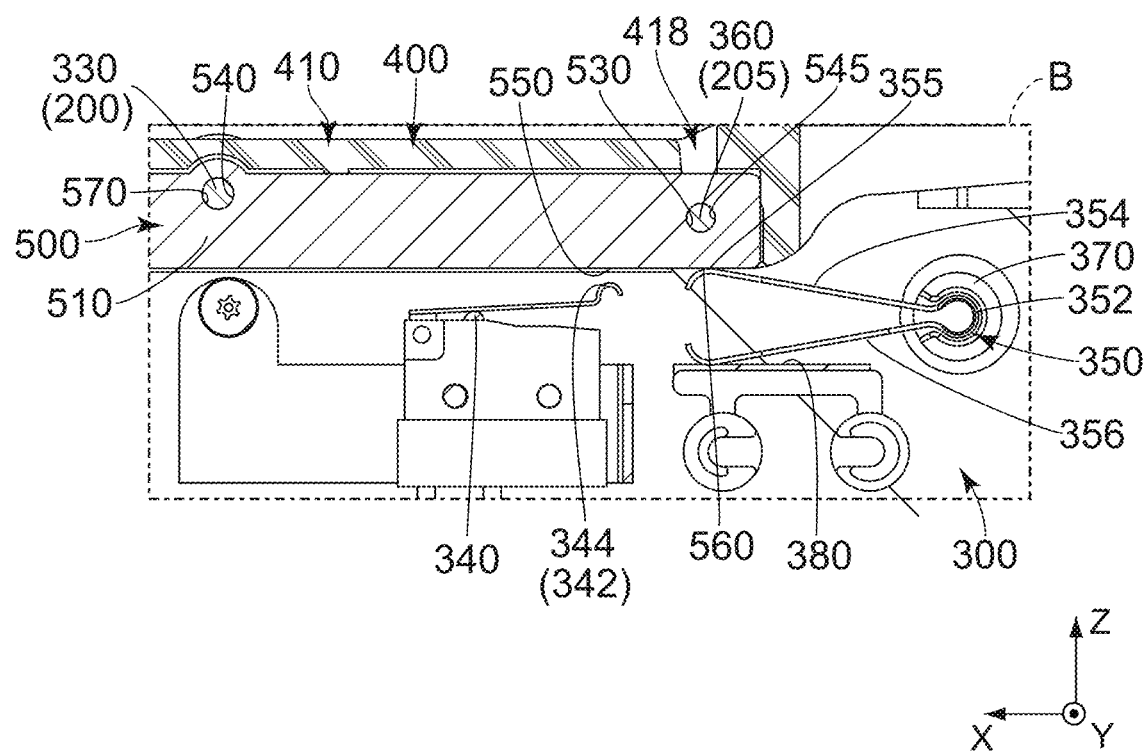
FIG. 5 is an enlarged, cross-sectional view showing a part which is enclosed by dotted line B of FIG. 4.

As shown in FIGS. 4 and 5, the charging connector 100 of the present embodiment comprises a connector main 300, a lever 400, a screw 360, a regulating portion 200, a restricting portion 205 and a cable 600.

As shown in FIGS. 4 and 5, the connector main 300 of the present embodiment comprises a reference surface 310, a mating portion 320, a shaft 330, a switch 340, a spring 350, a supporting portion 370 and a receiving portion 380.

As shown in FIG. 1, the reference surface 310 of the present embodiment is a portion which is brought into contact with a rear end of the inlet 700 in the front-rear direction when the charging connector 100 is mated with the inlet 700. As understood from FIGS. 4 and 5, the reference surface 310 is positioned forward of the regulating portion 200 in the front-rear direction. In other words, the regulating portion 200 is positioned rearward of the reference surface 310 in the front-rear direction. The reference surface 310 is positioned forward of the restricting portion 205 in the front-rear direction. In other words, the restricting portion 205 is positioned rearward of the reference surface 310 in the front-rear direction.

As shown in FIG. 4, the mating portion 320 of the present embodiment protrudes forward beyond the reference surface 310 in the front-rear direction. The mating portion 320 defines a front end of the connector main 300 in the front-rear direction. Specifically, the mating portion 320 defines a front end of the charging connector 100 in the front-rear direction. As understood from FIGS. 2 and 9, the mating portion 320 is received in the mating portion receiving portion 720 when the charging connector 100 is mated with the inlet 700.

Referring to FIG. 5, the shaft 330 of the present embodiment is made of metal. The shaft 330 has a cylindrical shape extending in a width direction. The shaft 330 is attached to the connector main 300. More specifically, opposite ends of the shaft 330 in the width direction are attached to the connector main 300. In the present embodiment, the width direction is a Y-direction. The shaft 330 is attached to the connector main 300 so as to be rotatable with respect to the connector main 300.

Referring to FIGS. 4, 5, 12 and 13, the lever 400 is movable between a locked position P1 and a released position P2 in a seesaw manner with the shaft 330 acting as a fulcrum. The lever 400 shown in each of FIGS. 1 to 7 is in a state where an operating portion 416 is not pressed down. The lever 400 shown in each of FIGS. 1 to 7 is positioned at the locked position P1. The lever 400 shown in each of FIGS. 8 to 14 is in a state where the operating portion 416 is pressed down. The lever 400 shown in each of FIGS. 8 to 14 is positioned at the released position P2.

Figure 13:
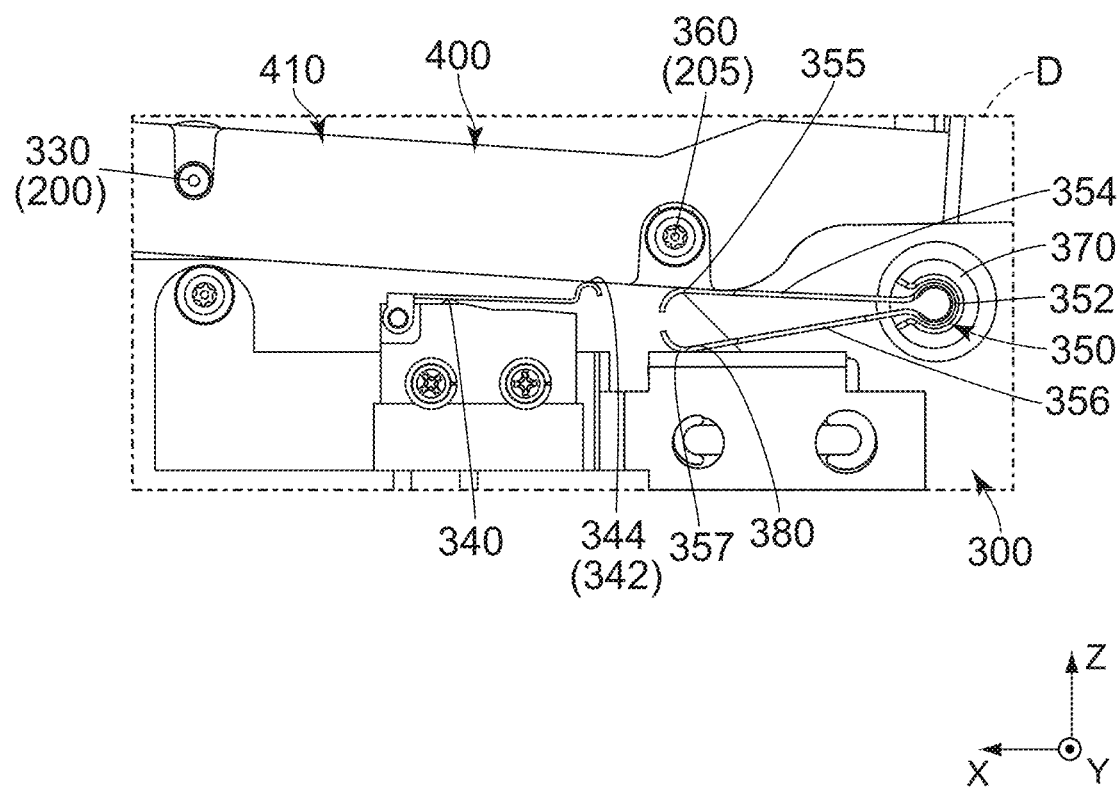
FIG. 13 is an enlarged, perspective view showing a part which is enclosed by dotted line D of FIG. 12.

Referring to FIGS. 5 and 13, the switch 340 of the present embodiment is a microswitch. The switch 340 has an actuator 342. The actuator 342 extends rearward in the front-rear direction. The actuator 342 has a pressed portion 344. The pressed portion 344 is positioned around a rear end of the actuator 342 in the front-rear direction.

Referring to FIG. 5, the spring 350 of the present embodiment is made of metal and is a so-called leaf spring. The present invention is, however, not limited thereto, but the spring 350 may be a spring other than a leaf spring, for example a compression coil spring. In addition, the spring 350 may be made of material other than metal.

As shown in FIG. 13, the spring 350 has a curved portion 352, a first arm 354 and a second arm 356.

As shown in FIG. 5, the curved portion 352 of the present embodiment has a C-shaped cross-section in a plane perpendicular to the width direction. The curved portion 352 is supported by the supporting portion 370.

As shown in FIG. 5, the first arm 354 of the present embodiment extends upward in an up-down direction from the curved portion 352 when the lever 400 is positioned at the locked position P1 (see FIG. 4). In the present embodiment, the up-down direction is a Z-direction. Specifically, upward is a positive Z-direction while downward is a negative Z-direction. The first arm 354 extends forward in the front-rear direction from the curved portion 352. The first arm 354 has a first contact portion 355. The first contact portion 355 is positioned around a front end of the first arm 354 in the front-rear direction.

As shown in FIG. 13, the second arm 356 of the present embodiment extends downward in the up-down direction from the curved portion 352. The second arm 356 extends forward in the front-rear direction from the curved portion 352. The second arm 356 is brought into contact with the receiving portion 380. Specifically, the second arm 356 is brought into contact with the receiving portion 380 from above. The second arm 356 has a second contact portion 357. The second contact portion 357 is positioned around a front end of the second arm 356 in the front-rear direction. The second contact portion 357 is brought into contact with the receiving portion 380. Specifically, the second contact portion 357 is brought into contact with the receiving portion 380 from above.

Referring to FIGS. 5 and 13, the supporting portion 370 of the present embodiment extends in the width direction. As understood from FIGS. 4 and 5, the supporting portion 370 is positioned rearward beyond the reference surface 310 in the front-rear direction. The supporting portion 370 is positioned below the lever 400 in the up-down direction. The supporting portion 370 is positioned forward of the operating portion 416 in the front-rear direction. The supporting portion 370 is positioned below the operating portion 416 in the up-down direction. The supporting portion 370 is positioned rearward of the switch 340 in the front-rear direction. The supporting portion 370 supports the curved portion 352 of the spring 350.

Referring to FIG. 5, the receiving portion 380 of the present embodiment is made of metal. As understood from FIGS. 4 and 5, the receiving portion 380 is positioned rearward beyond the reference surface 310 in the front-rear direction. The receiving portion 380 is positioned below the lever 400 in the up-down direction. The receiving portion 380 is positioned forward of the operating portion 416 in the front-rear direction. The receiving portion 380 is positioned below the operating portion 416 in the up-down direction. The receiving portion 380 is positioned rearward of the switch 340 in the front-rear direction. The receiving portion 380 is positioned forward of the curved portion 352 of the spring 350 in the front-rear direction.

As shown in FIG. 4, the lever 400 of the present embodiment extends in the front-rear direction. The lever 400 is positioned around an upper end of the charging connector 100. The lever 400 is positioned above the mating portion 320 in the up-down direction. As understood from FIGS. 7 and 12, the lever 400 of the present embodiment is held by the connector main 300 so as to be movable between the locked position P1 and the released position P2 in a seesaw manner.

Figure 15:
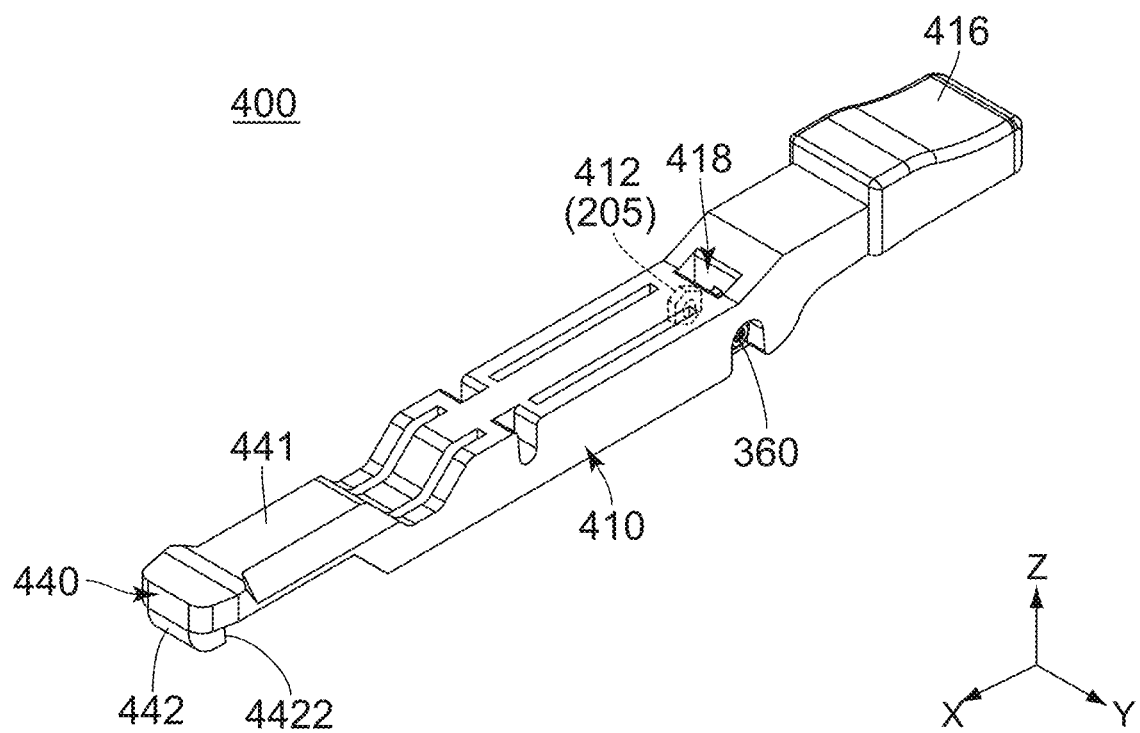
FIG. 15 is an upper, perspective view showing the lever which is included in the charging connector of FIG. 10. In the figure, a nut is illustrated by dotted line.
Figure 16:
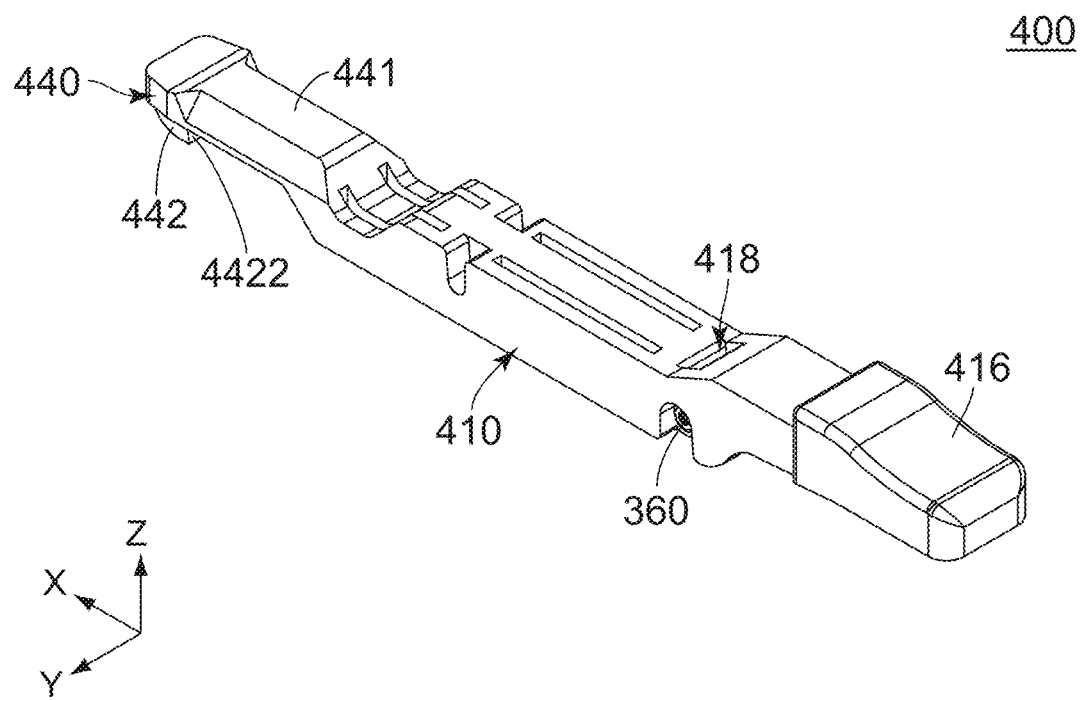
FIG. 16 is another upper, perspective view showing the lever of FIG. 15.

As shown in FIG. 15, the lever 400 of the present embodiment has a latch portion 440.

Figure 7:
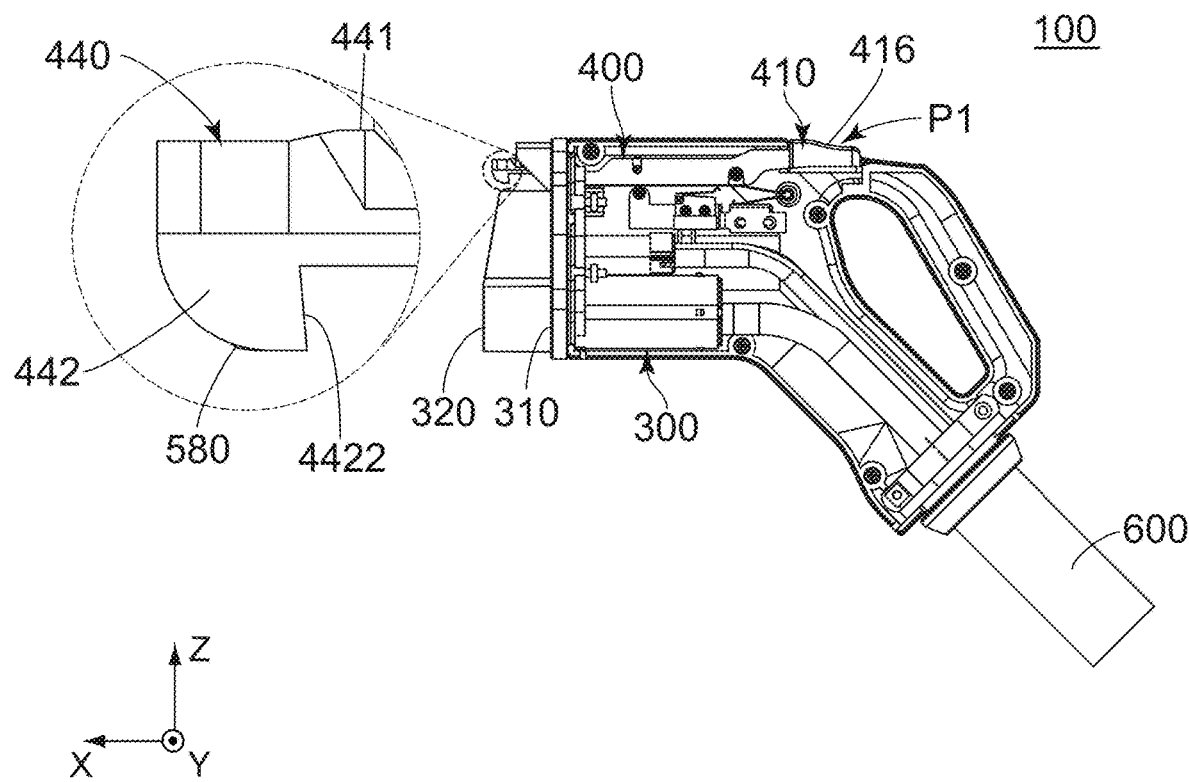
FIG. 7 is a partially cut-away, side view showing an internal structure of the charging connector of FIG. 3. In the figure, a part of a latch portion is illustrated enlarged.

Referring to FIGS. 2 and 9, the latch portion 440 of the present embodiment is a portion which is engaged with the inlet 700 when the charging connector 100 is mated with the inlet 700. More specifically, when the charging connector 100 is mated with the inlet 700, the latch portion 440 is engaged with the locked portion 710 to lock a mated state where the charging connector 100 is mated with the inlet 700. As shown in FIG. 7, the latch portion 440 protrudes forward beyond the reference surface 310 when the lever 400 is positioned at the locked position P1. The latch portion 440 defines a front end of the lever 400 in the front-rear direction. The latch portion 440 is provided with a locking lug 442. The latch portion 440 has an upper surface 441.

As shown in FIG. 7, the locking lug 442 of the present embodiment protrudes downward in the up-down direction. The locking lug 442 has a locking surface 4422.

As shown in FIG. 7, the locking surface 4422 of the present embodiment faces rearward. Specifically, the locking surface 4422 faces rearward in the front-rear direction when the lever 400 is positioned at the locked position P1. More specifically, the locking surface 4422 intersects with both the front-rear direction and the up-down direction when the lever 400 is positioned at the locked position P1. As understood from FIGS. 2, 7 and 9, when the charging connector 100 is mated with the inlet 700, the locking surface 4422 faces the locked surface 712 in the front-rear direction to lock the mated state of the charging connector 100 with the inlet 700.

As shown in FIG. 7, the upper surface 441 of the present embodiment faces upward in the up-down direction. The upper surface 441 defines an upper end of the latch portion 440.

Figure 20:
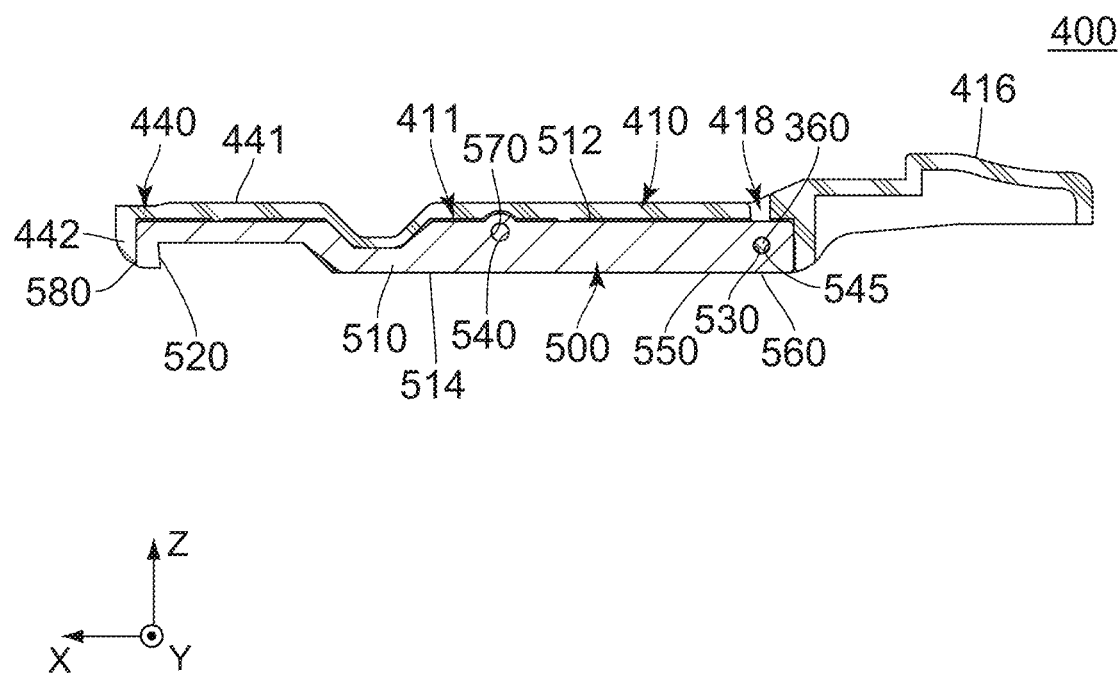
FIG. 20 is a cross-sectional view showing the lever of FIG. 19, taken along line E-E.

As shown in FIG. 20, the lever 400 has a main portion 410 and a reinforcing portion 500.

Figure 21:
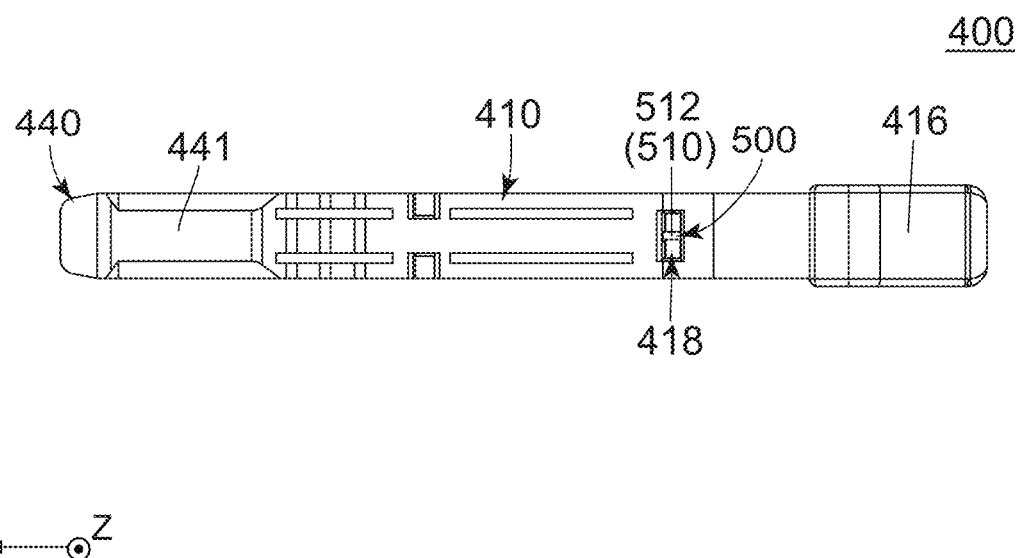
FIG. 21 is a top view showing the lever of FIG. 15.
Figure 23:
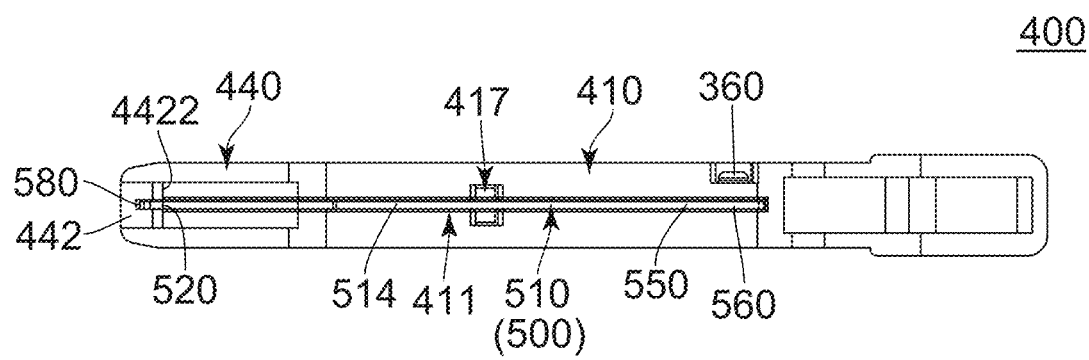
FIG. 23 is a bottom view showing the lever of FIG. 15.
Figure 24:
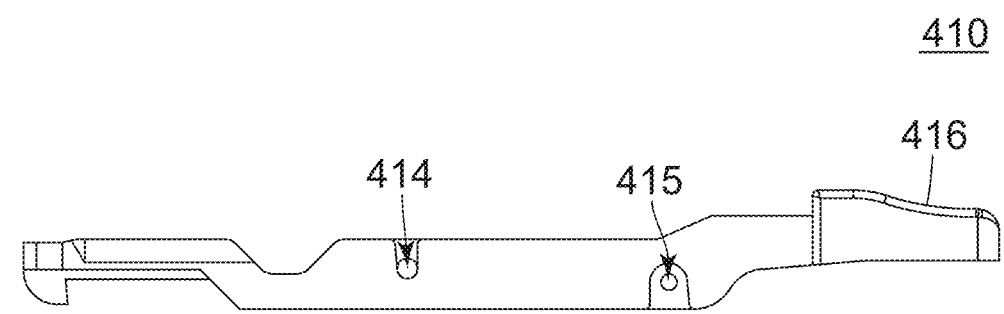
FIG. 24 is a side view showing a main portion which is included in the lever of FIG. 15.

Referring to FIG. 24, the main portion 410 of the present embodiment is made of resin. However, the present invention is not limited thereto. The material of the main portion 410 is not limited to resin, provided that the main portion 410 is made of insulator. As shown in FIG. 7, the main portion 410 extends in the front-rear direction. As shown in FIGS. 21, 23 and 24, the main portion 410 has a ditch 411, a first hole 414, a second hole 415, the operating portion 416, a first opening 417 and a second opening 418.

As understood from FIGS. 20 and 23, the ditch 411 of the present embodiment is opened downward in the up-down direction. The ditch 411 extends upward in the up-down direction. The ditch 411 is positioned at a middle of the main portion 410 in the width direction. The ditch 411 is positioned forward of the operating portion 416 in the front-rear direction.

As shown in FIG. 24, the first hole 414 of the present embodiment pierces the main portion 410 in the width direction. The first hole 414 is positioned forward of the second hole 415 in the front-rear direction. As understood from FIGS. 22 and 24, the first hole 414 is positioned rearward of the latch portion 440 in the front-rear direction. The first hole 414 is positioned forward of the operating portion 416 in the front-rear direction.

As shown in FIG. 24, the second hole 415 of the present embodiment pierces the main portion 410 in the width direction. The second hole 415 is positioned rearward of the first hole 414 in the front-rear direction. The second hole 415 is positioned forward of the operating portion 416 in the front-rear direction. As understood from FIGS. 22 and 24, the second hole 415 is positioned rearward of the latch portion 440 in the front-rear direction.

As shown in FIG. 21, the operating portion 416 of the present embodiment is positioned at a rear end of the lever 400 in the front-rear direction. As shown in FIG. 24, the operating portion 416 is positioned rearward of the second hole 415 in the front-rear direction. As understood from FIGS. 7 and 12, the operating portion 416 is a portion which is pressed by a user when the lever 400 is moved from the locked position P1 to the released position P2 in a seesaw manner.

As shown in FIG. 23, the first opening 417 of the present embodiment is opened downward in the up-down direction. The first opening 417 is positioned rearward of the latch portion 440 in the front-rear direction. As understood from FIGS. 21 and 23, the first opening 417 is positioned forward of the second opening 418 in the front-rear direction. As understood from FIGS. 23 and 24, the first opening 417 is positioned at a position same as that of the first hole 414 in the front-rear direction. The first opening 417 is positioned below the first hole 414 in the up-down direction. The first opening 417 communicates with the first hole 414. The first opening 417 is positioned forward of the second hole 415 in the front-rear direction. The first opening 417 is positioned forward of the operating portion 416 in the front-rear direction.

As shown in FIG. 21, the second opening 418 of the present embodiment is opened upward in the up-down direction. The second opening 418 is positioned rearward of the latch portion 440 in the front-rear direction. The second opening 418 is positioned forward of the operating portion 416 in the front-rear direction. A part of the reinforcing portion 500 is visible through the second opening 418 when the lever 400 is independently viewed from above. As understood from FIGS. 21 and 23, the second opening 418 is positioned rearward of the first opening 417 in the front-rear direction. As understood from FIGS. 21 and 24, the second opening 418 is positioned rearward of the first hole 414 in the front-rear direction. The second opening 418 is positioned at a position same as that of the second hole 415 in the front-rear direction. The second opening 418 is positioned above the second hole 415 in the up-down direction. The second opening 418 communicates with the second hole 415.

Figure 25:
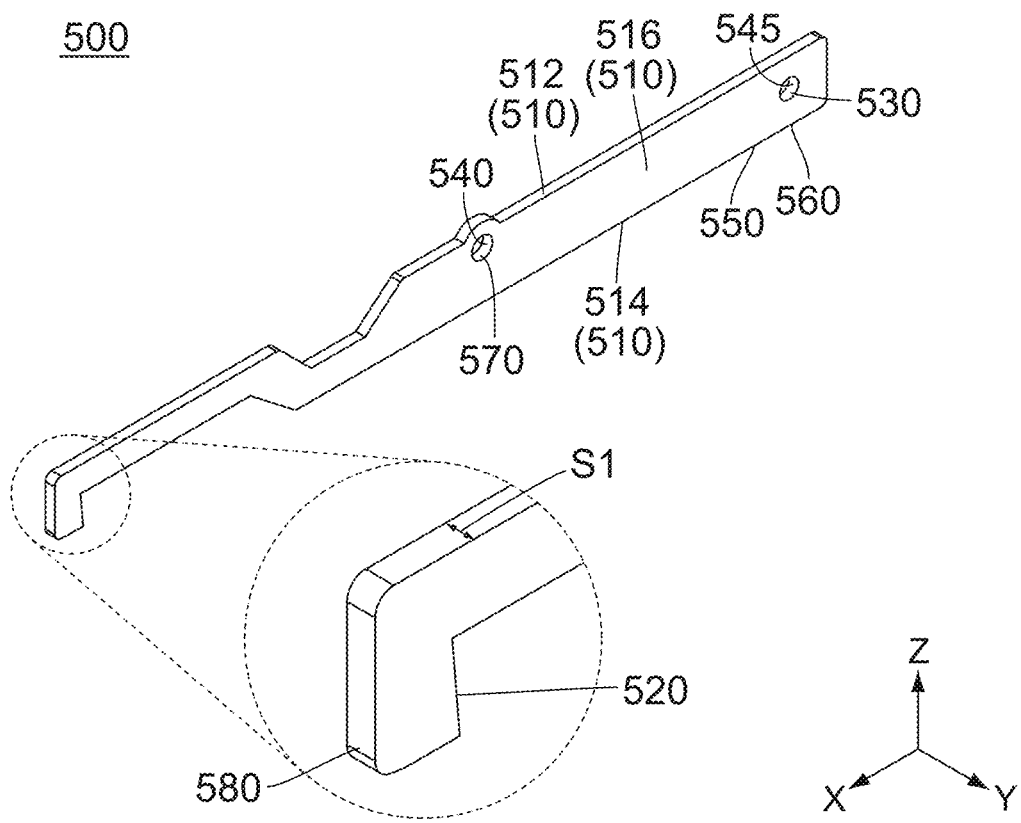
FIG. 25 is an upper, perspective view showing a reinforcing portion which is included in the lever of FIG. 15. In the figure, a part of the reinforcing portion is illustrated enlarged.
Figure 26:
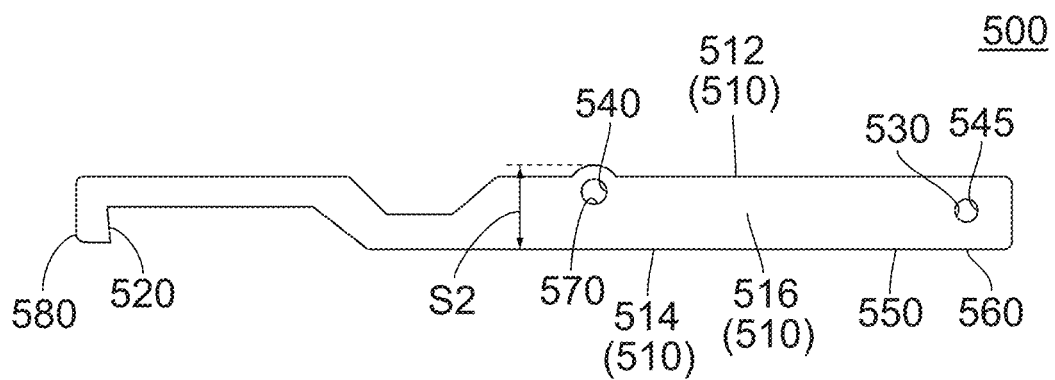
FIG. 26 is a side view showing the reinforcing portion of FIG. 25.

Referring to FIGS. 25 and 26, the reinforcing portion 500 of the present embodiment is made of metal plate 510. More specifically, the reinforcing portion 500 consists of a single metal plate 510 which is formed by punch press operation. Accordingly, the reinforcing portion 500 can be manufactured at low cost. However, the present invention is not limited thereto. Specifically, the material of the reinforcing portion 500 may be other than metal, provide that the material of the reinforcing portion 500 has high strength and toughness comparable to metal. The material of the reinforcing portion 500 may be, for example, resin reinforced by carbon fibers, or resin containing grass fibers.

Referring to FIGS. 20 and 21, the reinforcing portion 500 is not exposed on the upper surface 441 of the latch portion 440. Furthermore, the reinforcing portion 500 is not exposed on the operating portion 416. Accordingly, when a user operates the charging connector 100, a user is prevented from being accidentally brought into contact with the reinforcing portion 500 to receive an electric shock.

Referring to FIGS. 25 and 26, a size S1 of the metal plate 510 in the width direction perpendicular to the front-rear direction is smaller than a size S2 of the metal plate 510 in the up-down direction perpendicular to both the front-rear direction and the width direction. The metal plate 510 has an upper surface 512, a lower surface 514 and two side surfaces 516. The upper surface 512 defines an upper end of the metal plate 510 in the up-down direction. The lower surface 514 defines a lower end of the metal plate 510 in the up-down direction. The two side surfaces 516 define opposite ends, respectively, of the metal plate 510 in the width direction. Each of the upper surface 512 and the lower surface 514 is a cut surface produced by the punch press operation. Specifically, each of the upper surface 512 and the lower surface 514 is not a surface of a parent metal plate of the metal plate 510. Each of the side surfaces 516 is the surface of the parent metal plate of the metal plate 510. Specifically, each of the side surfaces 516 is not the cut surface produced by the punch press operation.

As shown in FIG. 20, the reinforcing portion 500 is held by the main portion 410. More specifically, the reinforcing portion 500 is held by the main portion 410 by being press-fit into the ditch 411 of the main portion 410. In the front-rear direction, a rear end of the reinforcing portion 500 is positioned forward of the operating portion 416. However, the present invention is not limited thereto. Specifically, the reinforcing portion 500 may extend to a point just below the operating portion 416, provided that the reinforcing portion 500 is not exposed on the operating portion 416. As shown FIG. 21, a part of the upper surface 512 is visible through the second opening 418 when the lever 400 is independently viewed from above. The upper surface 512 of the reinforcing portion 500 is not exposed on the upper surface 441 of the latch portion 440. As shown in FIG. 23, the lower surface 514 is visible when the lever 400 is independently viewed from below.

As shown in FIG. 26, the reinforcing portion 500 of the present embodiment is provided with a bearing 570 and a screw hole 530.

As shown in FIG. 26, the bearing 570 of the present embodiment is a hole which pierces the metal plate 510 in the width direction. As understood from FIGS. 20 and 24, the bearing 570 is positioned at a position same as that of the first hole 414 in the front-rear direction. The bearing 570 is positioned at a position same as that of the first hole 414 in the up-down direction. A center axis of the bearing 570 is coincide with a center axis of the first hole 414. As shown in FIG. 5, the shaft 330 is attached to the bearing 570. More specifically, the shaft 330 is attached to the bearing 570 so as to be rotatable with respect to the bearing 570. Referring to FIGS. 13 and 24, the shaft 330 is attached to the first hole 414 so as to be rotatable with respect to the first hole 414.

As described above, the shaft 330 is attached to the connector main 300 so as to be rotatable with respect to the connector main 300 and is attached to the bearing 570 so as to be rotatable with respect to the bearing 570. However, the present invention is not limited thereto. The shaft 330 may be attached to one of the connector main 300 and the bearing 570 so as not to be rotatable with respect to the one. Specifically, the shaft 330 may be modified, provided that the shaft 330 is rotatable with respect to at least one of the connector main 300 and the bearing 570.

As shown in FIG. 26, the screw hole 530 of the present embodiment is a hole piercing the metal plate 510 in the width direction. As understood from FIGS. 20 and 24, the screw hole 530 is positioned at a position same as that of the second hole 415 in the front-rear direction. The screw hole 530 is positioned at a position same as that of the second hole 415 in the up-down direction. A center axis of the screw hole 530 is coincide with a center axis of the second hole 415.

As shown in FIGS. 25 and 26, the reinforcing portion 500 has a locking portion 520, a switch pressing portion 550, a spring receiving portion 560, a regulated portion 540, a restricted portion 545 and a front exposed portion 580.

Figure 6:
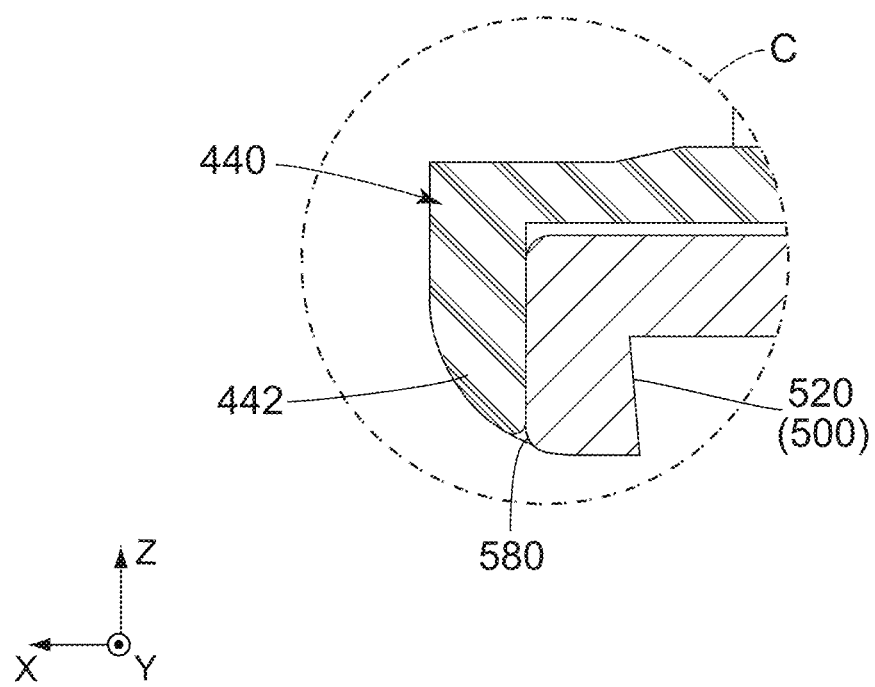
FIG. 6 is an enlarged, cross-sectional view showing a part which is enclosed by dotted line C of FIG. 4.
Figure 17:
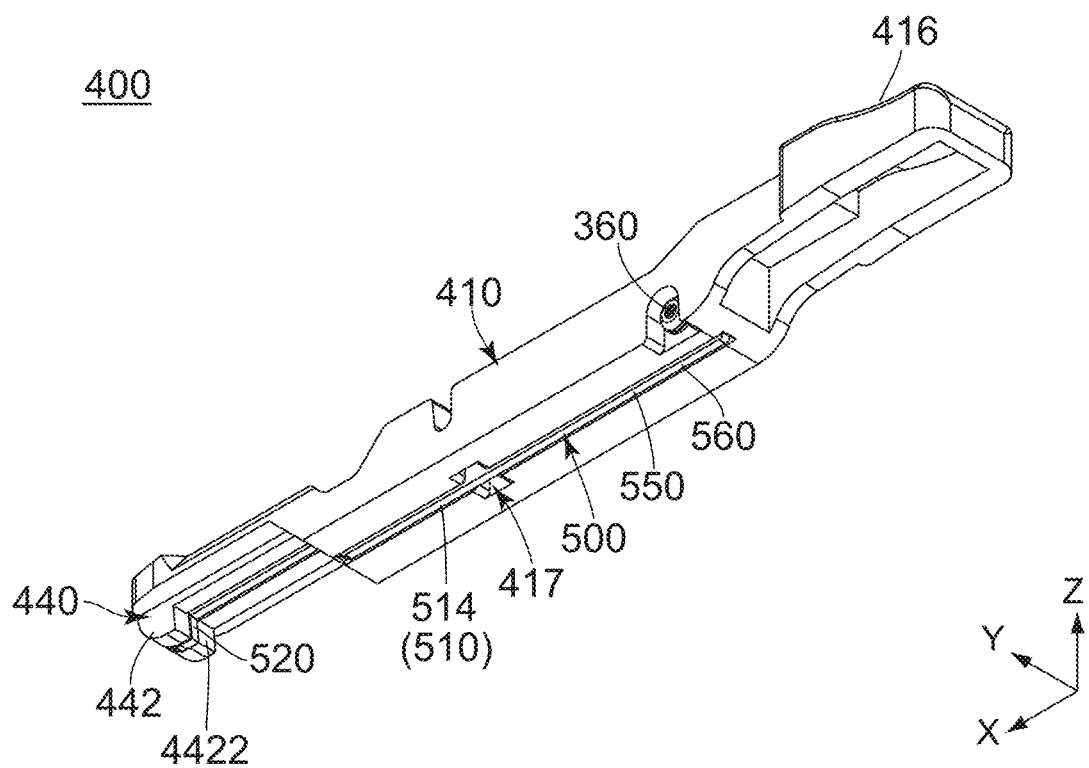
FIG. 17 is a lower, perspective view showing the lever of FIG. 15.
Figure 18:
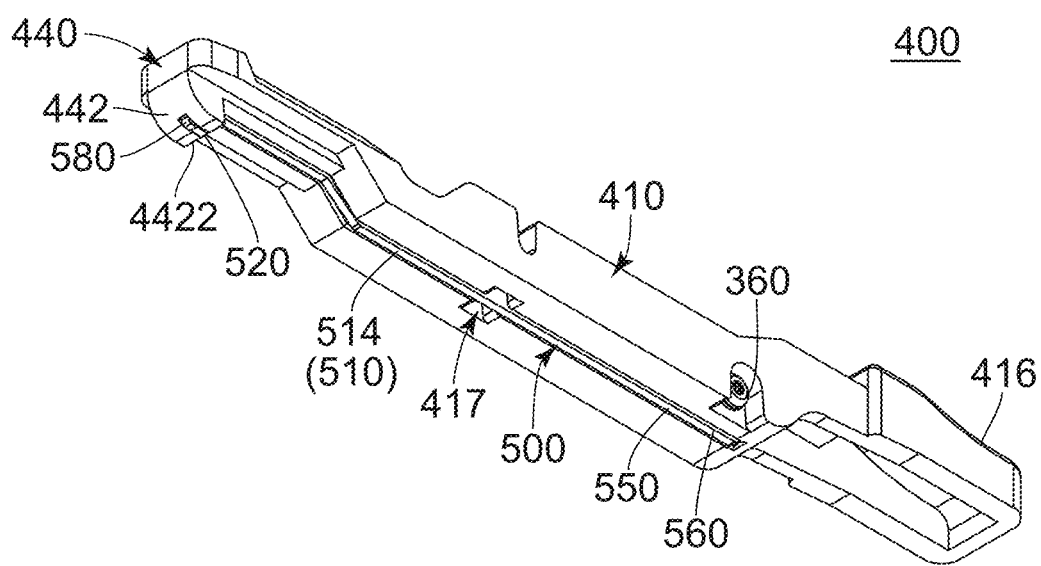
FIG. 18 is another lower, perspective view showing the lever of FIG. 15.

As shown in FIG. 6, the locking portion 520 faces rearward in the front-rear direction when the lever 400 is positioned at the locked position P1. More specifically, the locking portion 520 intersects with both the front-rear direction and the up-down direction when the lever 400 is positioned at the locked position P1. As shown in FIG. 17, the locking portion 520 of the present embodiment is exposed on the locking surface 4422. Accordingly, the locking portion 520 is mainly brought into contact with the locked surface 712 when the latch portion 440 is engaged with the inlet 700. Thus, a part of the locking surface 4422, which is made of resin, can be prevented from being abraded.

As shown in FIG. 17, the switch pressing portion 550 of the present embodiment is a part of the lower surface 514. The switch pressing portion 550 is exposed on the main portion 410. As understood from FIGS. 5 and 13, the switch pressing portion 550 is brought into contact with the switch 340. More specifically, when the lever 400 is positioned at the released position P2 (see FIG. 12), the switch pressing portion 550 presses the pressed portion 344 of the actuator 342 of the switch 340 downward so that the switch 340 is closed. As shown in FIG. 5, when the lever 400 is positioned at the locked position P1 (see FIG. 4), the switch pressing portion 550 is non-contact with the pressed portion 344 of the actuator 342 of the switch 340 so that the switch 340 is opened. Specifically, referring to FIGS. 4, 5, 12 and 13, the switch pressing portion 550 operates the switch 340 when the lever 400 is moved between the locked position P1 and the released position P2. Since the charging connector 100 is configured as described above, the main portion 410 of the lever 400 is prevented from being abraded as compared with an assumption where the main portion 410 made of resin operates the switch 340 by being directly brought into contact with the pressed portion 344 of the actuator 342 of the switch 340. Additionally, the switch pressing portion 550 can be accurately positioned in the up-down direction without being affected by dimensional inaccuracies of the main portion 410 which is formed by molding resin.

As shown in FIG. 17, the spring receiving portion 560 of the present embodiment is a part of the lower surface 514. The spring receiving portion 560 is exposed on the main portion 410. As shown in FIG. 5, the spring 350 is brought into contact with the spring receiving portion 560 and applies force to the lever 400 so that the lever 400 is urged toward the locked position P1. Specifically, the first arm 354 is brought into contact with the spring receiving portion 560. In detail, the first arm 354 is brought into contact with the spring receiving portion 560 from below. More specifically, the first contact portion 355 is brought into contact with the spring receiving portion 560. In detail, the first contact portion 355 is bought into contact with the spring receiving portion 560 from below. Since the charging connector 100 is configured as described above, the main portion 410 of the lever 400 is prevented from being abraded as compared with an assumption where the spring 350 is brought into direct contact with the main portion 410 made of resin.

As shown in FIG. 5, the regulated portion 540 of the present embodiment is a part of the bearing 570. Specifically, when the lever 400 is positioned at the locked position P1, the part of the bearing 570 faces forward in the front-rear direction to function as the regulated portion 540. More specifically, the regulated portion 540 is a part of an inner surface of the hole of the bearing 570. Specifically, when the lever 400 is positioned at the locked position P1, the part of the inner surface of the hole of the bearing 570 faces forward in the front-rear direction to function as the regulated portion 540.

As shown in FIG. 5, the restricted portion 545 of the present embodiment is a part of the screw hole 530. Specifically, when the lever 400 is positioned at the locked position P1, the part of the screw hole 530 faces forward in the front-rear direction to function as the restricted portion 545.

Figure 19:
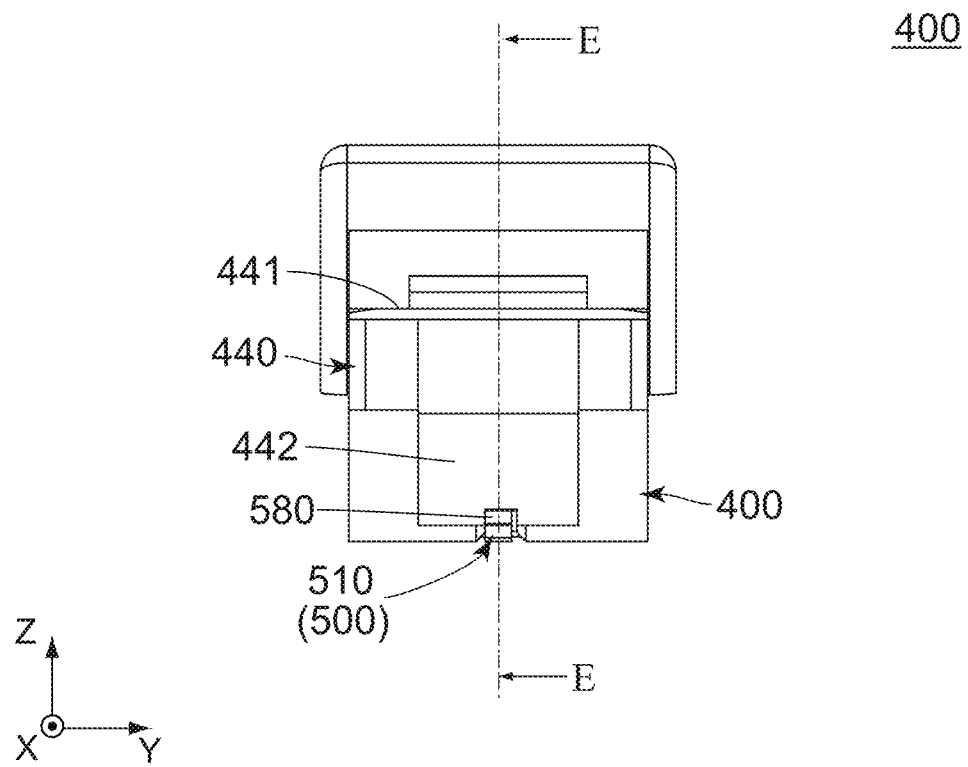
FIG. 19 is a front view showing the lever of FIG. 15.

As shown in FIG. 26, the front exposed portion 580 of the present embodiment is positioned at a front end of the reinforcing portion 500 in the front-rear direction. The front exposed portion 580 is positioned around a lower end of the reinforcing portion 500 in the up-down direction. The front exposed portion 580 is positioned forward of the locking portion 520 in the front-rear direction. As shown in FIG. 19, the front exposed portion 580 is exposed on the locking lug 442. The front exposed portion 580 is visible when the lever 400 is independently viewed from front. As shown in FIG. 20, the front exposed portion 580 is positioned around a lower end of the locking lug 442 in the up-down direction.

As shown in FIG. 15, the lever 400 has a fixing portion 412.

Figure 14:
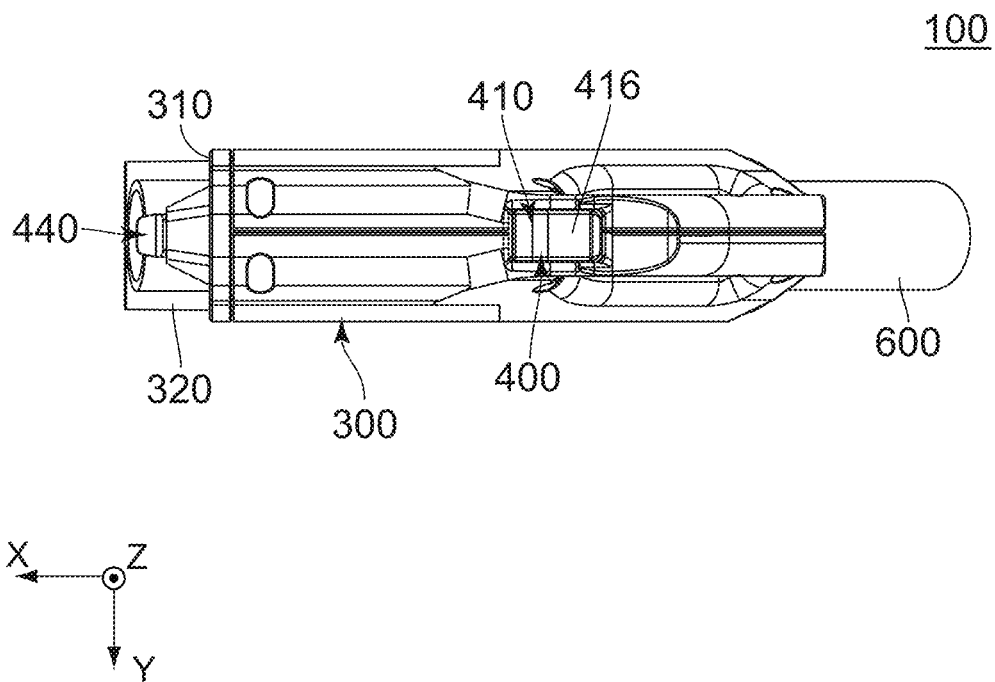
FIG. 14 is a top view showing the charging connector of FIG. 10.

Referring to FIG. 14, the fixing portion 412 of the present embodiment is a nut. Referring to FIGS. 15 and 24, the fixing portion 412 is positioned at a position same as that of the second hole 415 in the front-rear direction. The fixing portion 412 is positioned at a position same as that of the second hole 415 in the up-down direction. The fixing portion 412 is positioned outward beyond the second hole 415 in the width direction.

Figure 22:
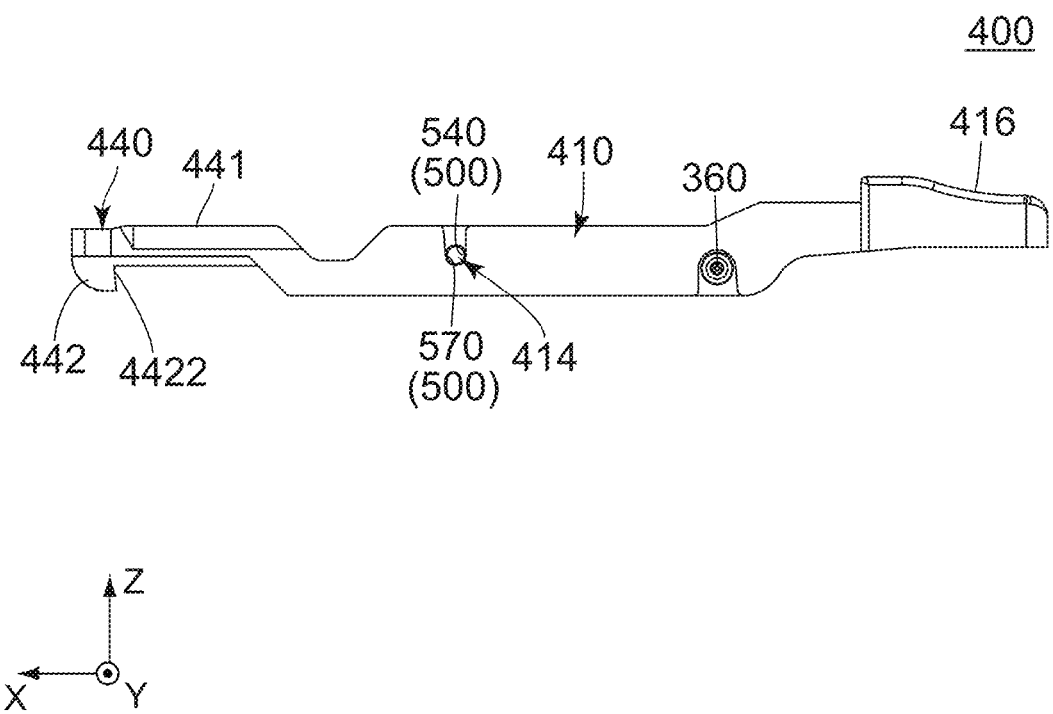
FIG. 22 is a side view showing the lever of FIG. 15.

Referring to FIGS. 15, 20 and 22, a set of the screw 360, the fixing portion 412 and the screw hole 530 regulates movement of the main portion 410 with respect to the reinforcing portion 500. More specifically, the screw 360 is fixed to the fixing portion 412 through the screw hole 530 so that the main portion 410 and the reinforcing portion 500 are fixed to each other. In detail, referring to FIGS. 15, 20, 22 and 24, the screw 360 is mated with the nut, which is the fixing portion 412, through the screw hole 530 and the second hole 415 so that the main portion 410 and the reinforcing portion 500 are fixed to each other.

Referring to FIG. 5, the regulating portion 200 of the present embodiment is the shaft 330. In other words, the shaft 330 functions as the regulating portion 200. The regulating portion 200 is held by the connector main 300.

Referring to FIGS. 5 and 15, the restricting portion 205 of the present embodiment is a set of the screw 360 and the fixing portion 412. Specifically, the set of the screw 360 and the fixing portion 412 functions as the restricting portion 205.

As shown in FIG. 5, when the lever 400 is positioned at the locked position P1 (see FIG. 4), the regulated portion 540 is positioned rearward beyond the regulating portion 200 in the front-rear direction and faces the regulating portion 200 in the front-rear direction. When the lever 400 is positioned at the locked position P1 (see FIG. 4), the regulating portion 200 regulates forward movement of the regulated portion 540 in the front-rear direction.

As shown in FIG. 5, when the lever 400 is positioned at the locked position P1 (see FIG. 4), the restricted portion 545 is positioned rearward of the restricting portion 205 in the front-rear direction and faces the restricting portion 205 in the front-rear direction.

As shown in FIG. 4, the cable 600 of the present embodiment extends rearward in the front-rear direction from the connector main 300. The cable 600 extends downward in the up-down direction from the connector main 300.

Hereinafter, description will be made in detail about movements of components of the charging connector assembly 800 at a time when the charging connector 100 is intended to be forcibly pulled away from the inlet 700 under the mated state where the charging connector 100 is mated with the inlet 700.

When a user applies rearward force to the charging connector 100 in the mated state, the locking portion 520 shown in FIG. 6 abuts against the locked surface 712 of the inlet 700 shown in FIG. 9 in the front-rear direction so that the locking portion 520 receives forward stress.

This causes that forward force is applied also to the regulated portion 540 shown in FIG. 5. The regulated portion 540 is, however, received by the regulating portion 200 shown in FIG. 5 so that forward movement of the regulated portion 540 in the front-rear direction is regulated. Thus, the forward stress applied to the locking portion 520 is received by the regulating portion 200.

In other words, when a user applies the rearward force to the charging connector 100 in the mated state, the locking portion 520 of the reinforcing portion 500, which is made of the metal plate 510, abuts against the locked surface 712 of the inlet 700 so that the stress applied to the locking portion 520 is received by the regulating portion 200 through the regulated portion 540. Accordingly, the latch portion 440 is prevented from being damaged if the charging connector 100 is intended to be forcibly pulled away from the inlet 700 under a state where the latch portion 440 is engaged with the inlet 700.

Although the specific explanation about the present invention is made above referring to the embodiments, the present invention is not limited thereto and is susceptible to various modifications and alternative forms.

Although the reinforcing portion 500 consists of the single metal plate 510, the present invention is not limited thereto. Specifically, the reinforcing portion 500 may be modified to consist of a plurality of metal plates 510 which are stacked in the width direction. If the lever 400 is modified so that the modified reinforcing portion 500 is incorporated in the lever 400, a latch portion 440 of the modified lever 400 has a greater strength while the modified lever 400 can be manufactured at low cost.

Although the reinforcing portion 500 of the present embodiment is held by the main portion 410 by being press-fit into the ditch 411 of the main portion 410, the present invention is not limited thereto. Specifically, the reinforcing portion 500 may be embedded in the main portion 410 via insert-molding.

Although the bearing 570 of the present embodiment is the hole piercing the metal plate 510 in the width direction, the present invention is not limited thereto. Specifically, the bearing 570 may be a hook-shaped portion which is provide on the metal plate 510, provided that the bearing 570 has the regulated portion 540 facing the shaft 330.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

The invention claimed is:

1. A charging connector mateable with an inlet along a front-rear direction, wherein:
the inlet is positioned forward of the charging connector in the front-rear direction;
the charging connector comprises a connector main, a lever and a regulating portion;
the connector main comprises a reference surface and a mating portion;
the reference surface is positioned forward beyond the regulating portion in the front-rear direction;
the mating portion protrudes forward in the front-rear direction from the reference surface;
the lever is held by the connector main so as to be movable between a locked position and a released position in a seesaw manner;
the lever has a latch portion;
the latch portion is engaged with the inlet when the charging connector is mated with the inlet;
the latch portion protrudes forward beyond the reference surface when the lever is positioned at the locked position;
the latch portion is provided with a locking lug;
the locking lug has a locking surface;
the locking surface faces rearward in the front-rear direction when the lever is positioned at the locked position;
the lever comprises a main portion and a reinforcing portion;
the main portion is made of resin;
the reinforcing portion is made of metal plate;
the reinforcing portion is held by the main portion;
the reinforcing portion has a locking portion and a regulated portion;
the locking portion is exposed on the locking surface;
when the lever is positioned at the locked position, the regulated portion is positioned rearward beyond the regulating portion in the front-rear direction and faces the regulating portion in the front-rear direction; and
when the lever is positioned at the locked position, the regulating portion regulates forward movement of the regulated portion in the front-rear direction.

2. The charging connector as recited in claim 1, wherein:
the connector main further comprises a shaft;
the shaft is attached to the connector main;
the shaft functions as the regulating portion;
the lever is movable between the locked position and the released position in a seesaw manner with the shaft acting as a fulcrum;
the reinforcing portion is provided with a bearing;
the shaft is attached to the bearing;
the shaft is rotatable with respect to at least one of the connector main and the bearing; and
when the lever is positioned at the locked position, a part of the bearing faces forward in the front-rear direction to function as the regulated portion.

3. The charging connector as recited in claim 1, wherein:
the charging connector further comprises a screw;
the lever has a fixing portion;
the reinforcing portion is provide with a screw hole; and
a set of the screw, the fixing portion and the screw hole regulates movement of the main portion with respect to the reinforcing portion.

4. The charging connector as recited in claim 1, wherein:
the connector main further comprises a switch;
the reinforcing portion further has a switch pressing portion;
the switch pressing portion is exposed on the main portion and is brought into contact with the switch; and
when the lever is moved between the locked position and the released position, the switch pressing portion operates the switch.

5. The charging connector as recited in claim 1, wherein:
the reinforcing portion further has a spring receiving portion;
the spring receiving portion is exposed on the main portion;
the connector main further comprises a spring made of metal; and
the spring is brought into contact with the spring receiving portion and applies force to the lever so that the lever is urged toward the locked position.

6. The charging connector as recited in claim 1, wherein:
the metal plate has a size in a lateral direction perpendicular to the front-rear direction;
the metal plate has another size in an up-down direction perpendicular to both the front-rear direction and the lateral direction; and
the size of the metal plate in the lateral direction is smaller than the size of the metal plate in the up-down direction.

\* \* \* \* \*